United States Patent [19]
Clarke

[11] Patent Number: 4,782,774
[45] Date of Patent: * Nov. 8, 1988

[54] DEEP BAND FERTILIZER AND DOUBLE SIDE BAND SEEDING ATTACHMENT

[76] Inventor: George P. Clarke, 309 Assiniboine Drive, Saskatoon, Saskatchewan, Canada, S7K 3Z1

[*] Notice: The portion of the term of this patent subsequent to Mar. 31, 2004 has been disclaimed.

[21] Appl. No.: 35,410

[22] Filed: Apr. 7, 1987

Related U.S. Application Data

[63] Continuation-in-part of Ser. No. 793,895, Nov. 1, 1985.

[51] Int. Cl.4 .............................................. A01C 5/08
[52] U.S. Cl. ...................................... 111/73; 172/739
[58] Field of Search ................... 111/73, 80, 83–86, 111/7; 172/739, 740

[56] References Cited

U.S. PATENT DOCUMENTS

| | | | |
|---|---|---|---|
| 978,348 | 12/1910 | Yeatts | 172/739 X |
| 1,025,771 | 5/1912 | Waterman | 172/681 |
| 1,412,615 | 4/1922 | Johnson | 172/739 X |
| 3,307,508 | 3/1967 | Russell | 111/86 |
| 3,519,086 | 7/1970 | Padgett | 172/740 |
| 4,653,412 | 3/1987 | Clarke | 111/86 X |

Primary Examiner—James R. Feyrer
Attorney, Agent, or Firm—Cushman, Darby & Cushman

[57] ABSTRACT

A fertilizing and seeding apparatus for attachment to a cultivator shank includes an adapter for rigid attachment to the cultivator shank and a fertilizer blade and a double blade seeder. Only forward pivotal motion of the tools from a normal operating position is readily permitted thus minimizing possible clogging of fertilizer and seed outlet apertures, and/or facilitating the cleaning of such apertures.

2 Claims, 4 Drawing Sheets

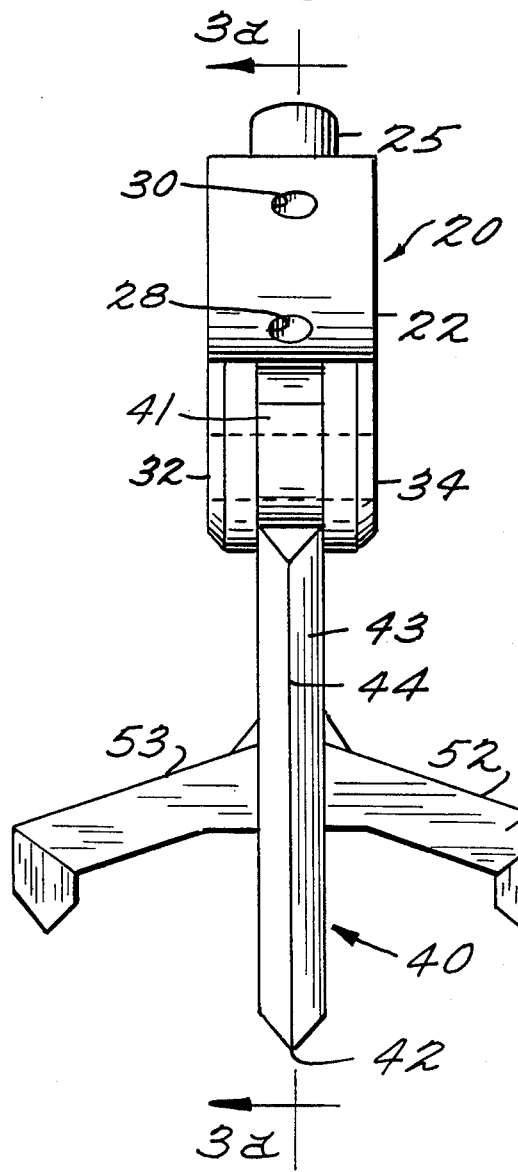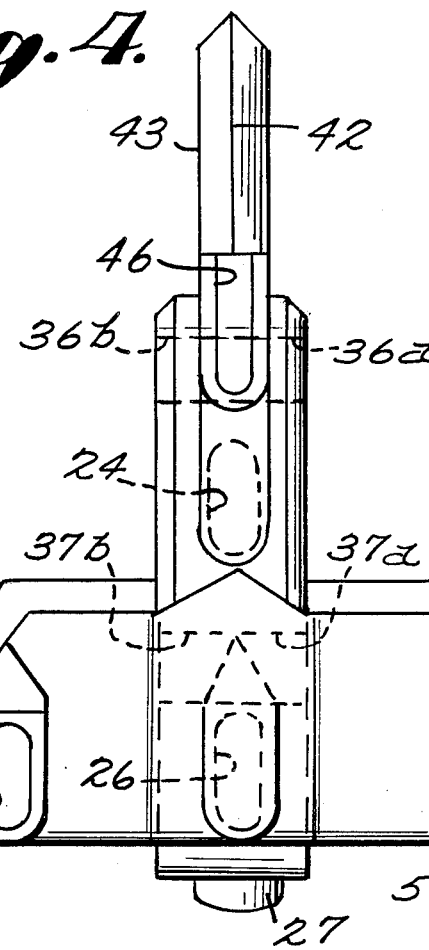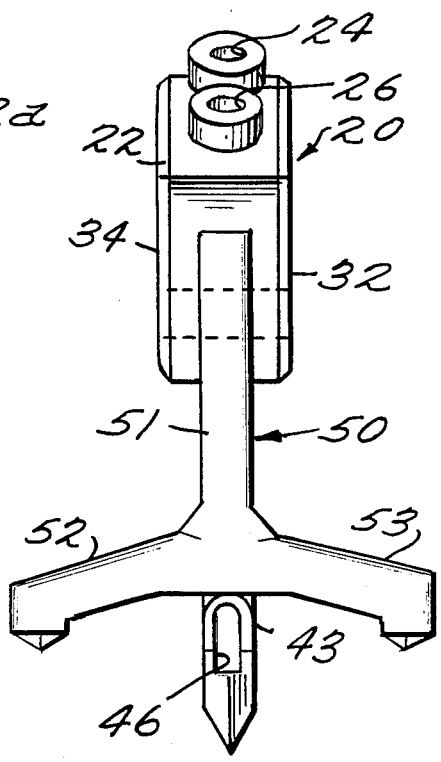

DEEP BAND FERTILIZER AND DOUBLE SIDE BAND SEEDING ATTACHMENT

The present invention relates to agricultural fertilizing and seeding apparatus. In particular, the exemplary embodiment provides a three piece assembly for attachment to a cultivator shank: (a) an adapter, (b) a fertilizer blade and (c) a double blade seeder. The fertilizer blade and the double blade seeder are pivotally attached to the adapter for (a) avoidance of soil clogging during turns, (b) easy replacement, and (c) easy cleaning of the apparatus.

BACKGROUND OF THE INVENTION

Earth working tools, such as sod-busters and banding applicator tools, are generally attached directly to the shank of a cultivator by a stem portion secured by bolts. Problems occur with this type of securing method when, for example, the tool must be replaced due to excessive wear or damage, or the tool becomes clogged with soil or debris. Generally, considerable time is required to replace the tool or to remove clogs.

Many cultivator shanks are on 12 inch pitch and therefore apply seed and/or fertilizer in rows 12 inches apart. There are several situations, however, where it is desirable to apply seeds, for example, in rows less than twelve inches apart. It is also often time-consuming and cumbersome to clean or replace existing arrangements of earth working/applicator blades on cultivator equipment. And, where rigid (or even spring loaded pivot) blade/tool mounts are involved, turning the cultivator around (i.e. at the end of a field in preparation for a return pass in the other direction or as in contour farming) typically causes reverse relative tool motion near to or even through the ground (i.e. on the "inside" of the turn) and thus risks clogging with soil any trailing open applicator ports.

Some typical (but not exhaustive) examples of prior seeding/fertilizing tools can be found in:
   Canadian Pat. No. 1,174,907-Kopecky (1984)
   U.S. Pat. No. 2,159,652-Brunner (1939)
   U.S. Pat. No. 2,889,788-Van Dorn (1959)
   U.S. Pat. No. 2,920,587-Shriver (1960)
   U.S. Pat. No. 3,122,111-Taylor, Sr. (1964)
   U.S. Pat. No. 4,116,140-Anderson (1978)
   U.S. Pat. No. 4,466,364-Hassenfritz (1984)

Double banded seeders, per se are also known as, for example, in U.S. Pat. No. 2,357,760- Peacock (1944).

There are, of course, also many prior fertilizing tools, some examples of which may be found in:
   Canadian Pat. No. 496,102-Hannibal (1953)
   U.S. Pat. No. 1,020,017-Williams (1977)
   U.S. Pat. No. 1,110,500-Stump (1981)
   U.S. Pat. No. 1,129,256-Raubenheimer (1982)
   U.S. Pat. No. 1,172,107-Rasprick (1984)
   U.S. Pat. No. 3,188,989-Johnston (1965)
   U.S. Pat. No. 3,259,087-Horton (1966)
   U.S. Pat. No. 3,625,166-Woodley (1971)
   U.S. Pat. No. 3,919,951-Williams (1975)
   U.S. Pat. No. 4,033,271-Williams et al (1977)
   U.S. Pat. No. 4,132,181-Smith et al (1979)
   U.S. Pat. No. 4,201,142-Stump (1980)
   U.S. Pat. No. 4,311,104-Steilen et al (1982)
   U.S. Pat. No. 4,355,589-Wetmore (1982)

While some of these prior arrangements have provided for double-banded seeding and independent simultaneous fertilizer applications (e.g. see Kopecky), none are believed to have yet provided an optimum solution to the problems at hand. However, I have now discovered an improved assembly which may simultaneously provide the following features:

(a) seed and fertilizer can be applied simultaneously;

(b) the amount of applied seed and fertilizer can be controlled independently;

(c) separate one-way free pivot mounts are provided for the fertilizer and seeding blades, respectively so as to (i) minimize soil clogging during turns, (ii) permit easy access for cleaning the outlet ports, and (iii) permit convenient blade replacement; and (d) double banded seeding can be realized (e.g. so as to seed rows with 6 inch pitch even through the cultivator mounting shanks are at 12 inch pitch).

SUMMARY OF THE INVENTION

The apparatus of the present invention comprises an adapter with means for rigid attachment to a cultivator shank, together with a fertilizer blade and a seeder blade pivotally attached to the adapter.

In the exemplary embodiment, the adapter has a base portion and two parallel depending mounting flanges which define a receiving channel. The base portion also has two through apertures: a fertilizer aperture and a seed aperture.

The fertilizer blade, in the exemplary embodiment, is an elongated blade having a cutting edge on the front side. It also has a fertilizer delivery channel with an inlet at its top end and an outlet at the bottom end of its rear side. The fertilizer blade is pivotally connected to the adapter so it can pivot forwardly of its normal operating position during reverse movements and then return thereto during forward relative movement through the soil. The fertilizer blade may be matingly received within the receiving channel of the adapter such that its top end abuttingly engages the adapter base portion to align the fertilizer outlet aperture of the adapter with the fertilizer delivery channel inlet of the fertilizer blade.

The (double) seeder blade (in the exemplary embodiment) is located to the rear of the fertilizer blade (i.e. so as to follow in its draft), has an upside-down Y-shaped design and has a top blade section and a left and right blade section projecting laterally and downwardly from the top blade section. Each of the blade sections of the double blade seeder has a cutting edge on the forward side (i.e. the side facing the fertilizer blade). The double blade seeder, like the fertilizer blade, has a delivery channel with an inlet at the upper end of the top blade section and an outlet at the lower end of the rearward side of the left and right blade sections. The double blade seeder is also pivotally connected to the adapter permitting the double blade seeder to readily pivot forwardly of its normal operating position during reverse relative movements through the soil and then automatically to return to the proper operating position during subsequent forward relative movement through the soil. In its operating position, the upper end of the top blade is matingly received within the receiving channel of the adapter on the rear side of the fertilizer blade such that the upper end abuttingly engages the adapter base portion between the flanges and the seed outlet aperture of the adapter base portion aligns with the seed delivery inlet channel of the double blade seeder.

BRIEF DESCRIPTION OF THE DRAWINGS

FIG. 3b is a cross-sectional view along line 3b–3b of FIG. 3a.

FIG. 4 is a view of the bottom of the exemplary embodiment of FIG. 1.

FIG. 5 is a view from in front of the exemplary embodiment of FIG. 1.

FIG. 6 is a view from behind the exemplary embodiment of FIG. 1.

DETAILED DESCRIPTION OF THE EXEMPLARY EMBODIMENT

Figure 1:
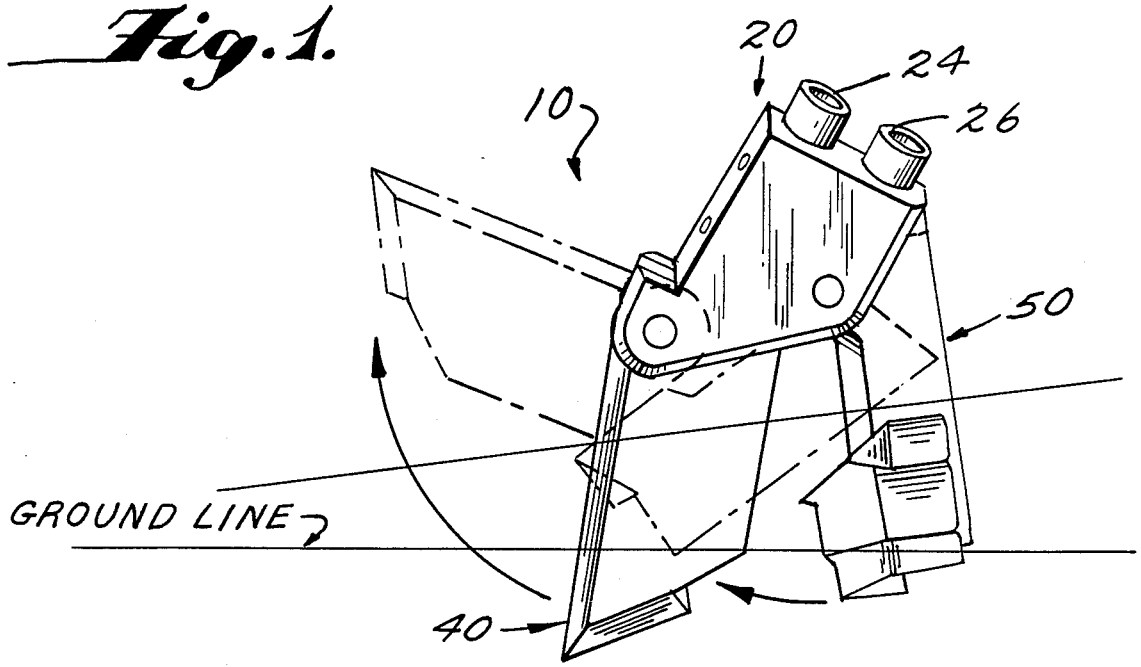
FIG. 1 is a perspective view of a presently preferred embodiment of the subject invention with the fertilizer blade and double blade seeder shown in their normal operating positions, and forwardly rotated (in phantom) to minimize clogging during relative reverse movements through the soil and/or to create easy access for cleaning.

Referring now to the drawings wherein like numerals indicate like parts, the numeral 10 indicates a presently preferred exemplary embodiment of this invention. In particular, the apparatus depicted in FIGS. 1 and 2 comprises an adapter 20, a fertilizer blade 40, and a double blade seeder 50.

The adapter 20 interconnects the fertilizer blade 40 and the double blade seeder 50 to a shank 12 of a conventional cultivator. The adapter 20 includes a base portion 22 which is provided with two apertures: fertilizer aperture 24 and seed aperture 26, on its top side, and two other apertures (or, alternatively, protruding threaded bolt shanks) 28 and 30 on its front side. Bolts 29 and 31 secure the shank 12 to the apparatus 10 via the apertures 28 and 30. Bosses 25 and 27 are fastened to the adapter 20 directly over apertures 24 and 26. The two bosses are for the air fertilizer 21 and air seeder 23 connections which, once installed, do not have to be disturbed unless the adapter 20 is to be removed.

The base portion 22 is further provided with parallel flanges 32 and 34 which depend from the base portion 22 to define a receiving channel 35 having a forward opening 35a and a rearward opening 35b. The flanges 32 and 34 are provided with aligned apertures 36a and 36b for connection with the fertilizer blade 40, and 37a and 37b for connection with the double blade seeder 50.

The fertilizer blade 40 has a top end 41 which is matingly received by channel 35a such that the top end 41 of the fertilizer blade 40 abuttingly engages the base portion 22 between flanges 32 and 34 so as to stop rearward pivoting motion of the tool 40 at is desired operating position during relative forward motion through the soil. A pivotal securing means, such as pin 38 passes through aligned aperture 36a (in a press fit) and then through corresponding aperture 36c of the fertilizer blade, and then through aperture 36b (in a press fit). Press fits at 36a and 36b releasably secure the fertilizer blade 40 to the adapter 20 so that it can be conveniently replaced by simply knocking out pin 38 from its press fittings. At the same time, pin 38 permits ready pivotal movement of the tool 40 via its mounting aperture 36c. Alternatively, a suitable bolt and nut may be used instead of pin 38.

The fertilizer blade 40 is preferably a steel casting advantageously made from high strength and high wear resistant chrome moly steel. The high tensile steel blades stand up to the high impact load demanded by the use of more powerful and faster tractor units.

Figure 2:
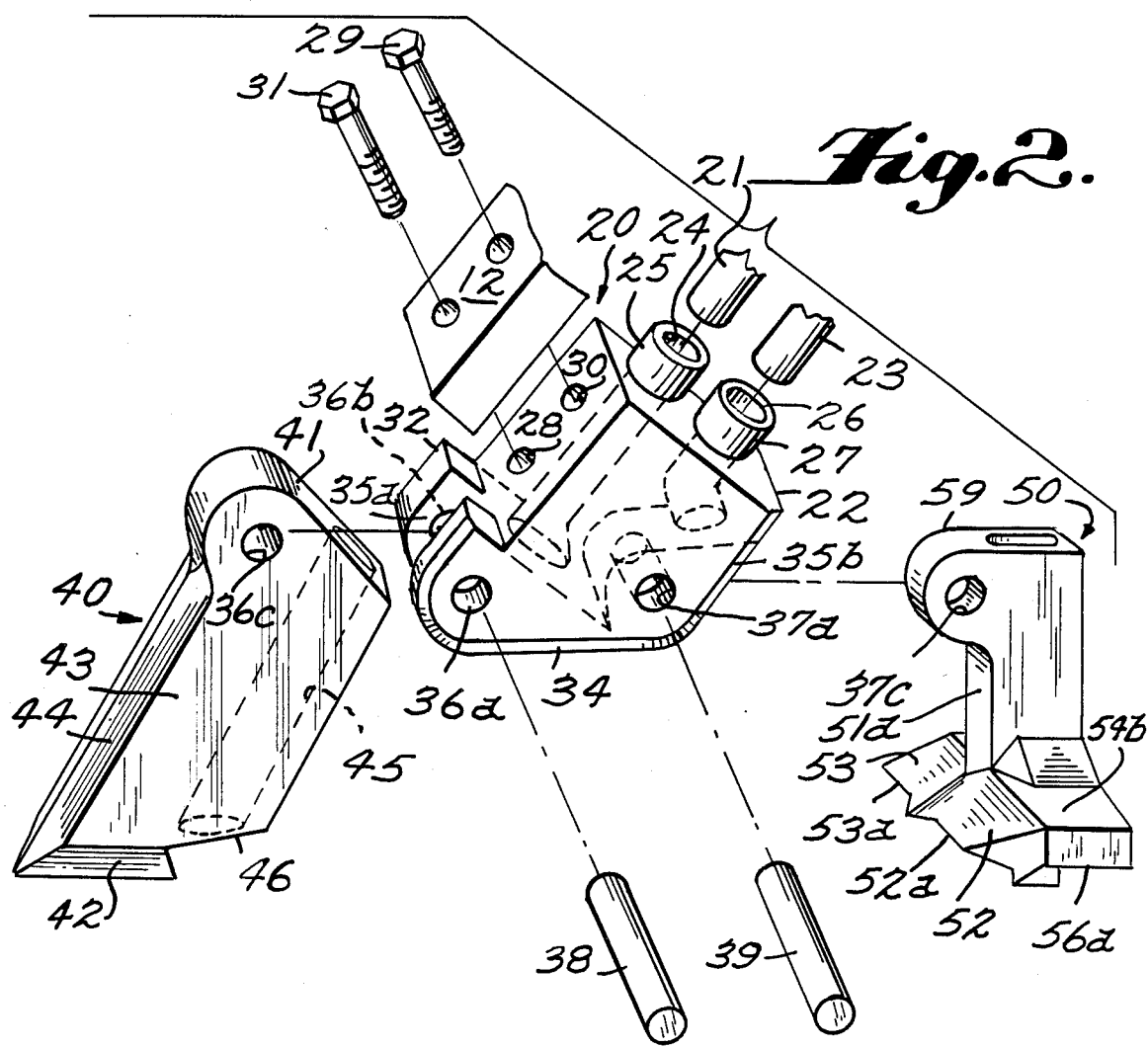
FIG. 2 is an exploded view of the exemplary apparatus of FIG. 1.

The fertilizer blade 40 can rotate on pin 38 as shown in FIG. 1 in phantom. This feature accomplishes two things: first, when the cultivator is turning, a part of it can be moving backwards which could plug a fixed blade. With the present design, the blade 40 readily tips forwardly which allows the outlet passage always to be trailing, thus not forcing soil into the passage. Secondly, if the passage in the blade 40 is plugged for any reason, the blade 40 can be manually tipped and readily cleaned out (see FIG. 1). When the blade eventually wears out it can be replaced very quickly by pressing out the pin, inserting a new blade and driving the pin back into place.

The fertilizer blade 40 may include an elongated blade 43 having a forward facing cutting edge 44 which is adapted to cut through the earth and minimize friction. Referring to FIG. 1, the apparatus of the invention 10, moves "forwardly" to the left of the sheet of drawings when in use.

Figure 3A:
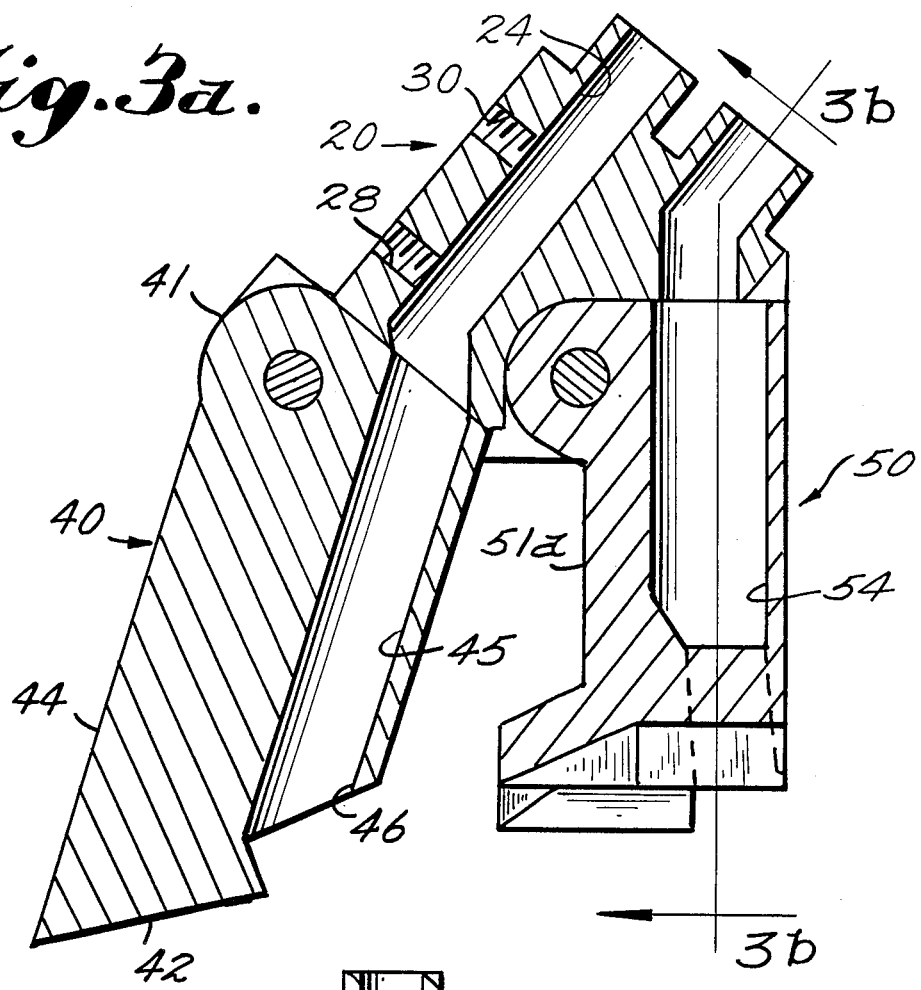
FIG. 3a is a cross sectional view along line 3a—3a of FIG. 5
Figure 3B:
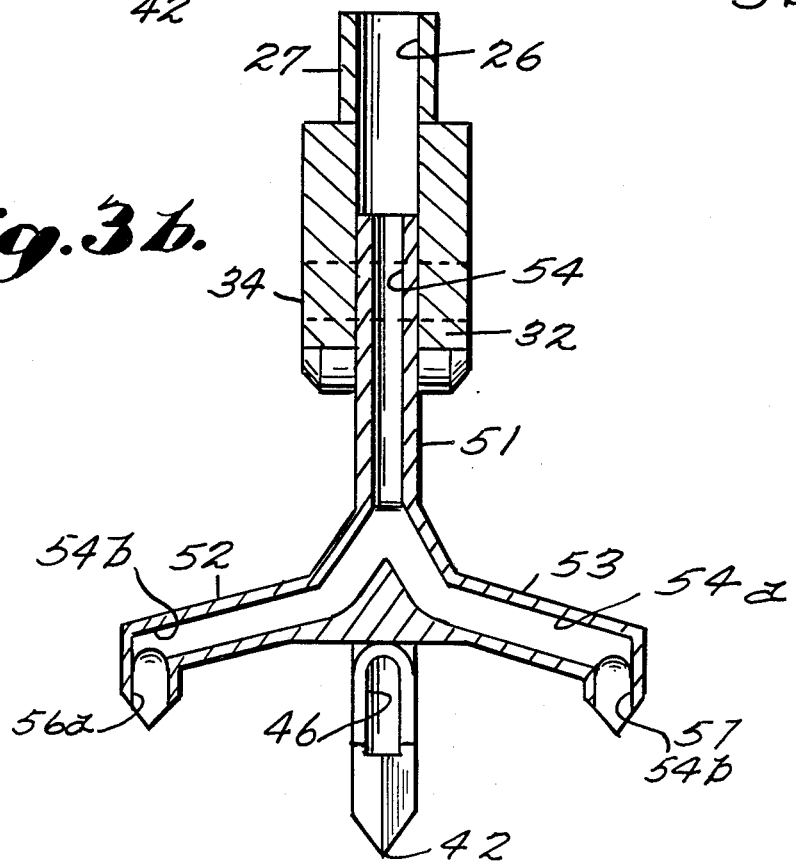

Cast into the blade 40 may be a fertilizer delivery channel 45 as shown in FIG. 3. Channel 45 has an inlet adapted to connect with the outlet of fertilizer aperture 24 of the adapter 20 when the apparatus is in the operating position. Further, channel 45 has an oulet port 46 which is at the rear side of the bottom end 42 of the fertilizer blade 40 as shown in FIGS. 1 and 6. Outlet port 46 thus delivers fertilizer into the ground behind the blade 40 to reduce the possibility of the outlet port 46 becoming clogged with soil. The bottom end 42 of the fertilizer blade 40 forms an edge as shown in FIGS. 5 and 6.

Another feature of the exemplary embodiment is that this blade 40 can also be used for deep banding anhydrous ammonia or liquid fertilizers which are usually delivered to the tips through small diameter plastic tubes. With this design, the tube can be inserted into the passage way in the adapter 20 and fertilizer blade 40 so it discharges at outlet port 46. The tube may be clamped to the adapter 20 at the fertilizer aperture 24 to keep it in place.

The exemplary apparatus 10 also may employ a double blade seeder 50. This double blade seeder 50 attaches to adapter 20 via a top end 59 which is matingly received by rearward channel opening 35b. The top end 59 of the seeder also abuttingly engages the base portion 22 between the flanges 32 and 34 so as to permit only forward pivotal motion—for the same reasons are already explained with respect to tool 40. The outlet of seed aperture 26 aligns with the inlet of seed delivery channel 54. Pin 39 passes with a press fit through apertures 37a and 37b of the flanges and also pivotally passes through aperture 37c of the double blade seeder 40. This allows the double blade seeder 50 to rotate forwardly (see FIG. 1) giving the same advantages as outlined for the fertilizer blade 40. Alternatively, a nut and bolt may be used instead of pin 39.

When the double blade seeder 50 is worn out it may simply and quickly be replaced as outlined for the fertilizer blade 40. The double blade seeder 50 is also preferably cast of the same good quality steel as the fertilizer blade 40. To minimize friction and collection of trash, the downward leg of the double blade seeder 50 preferably follows in the wake of the fertilizer blade 40 and does not divide above the soil surface. A feature of this design is that the seed dropping in the downward leg is divided in the downward leg thus effecting a reasonable division of seeds to the left and right seed band outlets 56a and 56b (which may be of the same shape as outlet 46 of the fertilizer blade 40).

The exemplary double blade seeder 50 has an upside down Y-shaped design as shown in FIG. 6. Depending from adapter 20 is top blade section 51, and extending outwardly and downwardly from top blade section 51 are left blade section 53 and right blade section 52. Blade sections 51, 52 and 53 are all provided with leading cutting edges 51a, 52a and 53a respectively, which are adapted to cut through the earth.

Cast into double blade seeder 50 may be a seed delivery channel 54 which has an inlet adapted to align with aperture 26 of adapter 20 as shown in FIG. 3. Channel 54 divides into channels 54a and 54b at the lower end of top blade section 51 as it continues downward and outwardly into blade sections 52 and 53. Channels 54a and 54b terminate at outlet ports 56a and 56b respectively and shown in FIGS. 4 and 6.

The bottom ends of blade sections 52 and 53 may form edges similar to the bottom edge of blade 40, as shown in FIGS. 5 and 6.

Outlet ports 56a and 56b deliver seed into the ground behind the double blade seeder 50 to reduce the possibility of the seed outlet ports 56a and 56b becoming clogged with soil.

Although the design dimensions will vary to suit a variety of conditions, the fertilizer blade 40 may typically be designed to band fertilizer 4 inches below the soil surface, and the double blade seeder 50 may typically be designed to band the seed 2 inches below the soil surface at 3 inches to the left and right of the fertilizer band 40. The fertilizer may thus be delivered into the ground beneath the seed so as to enhance downward root growth.

Figure 7:
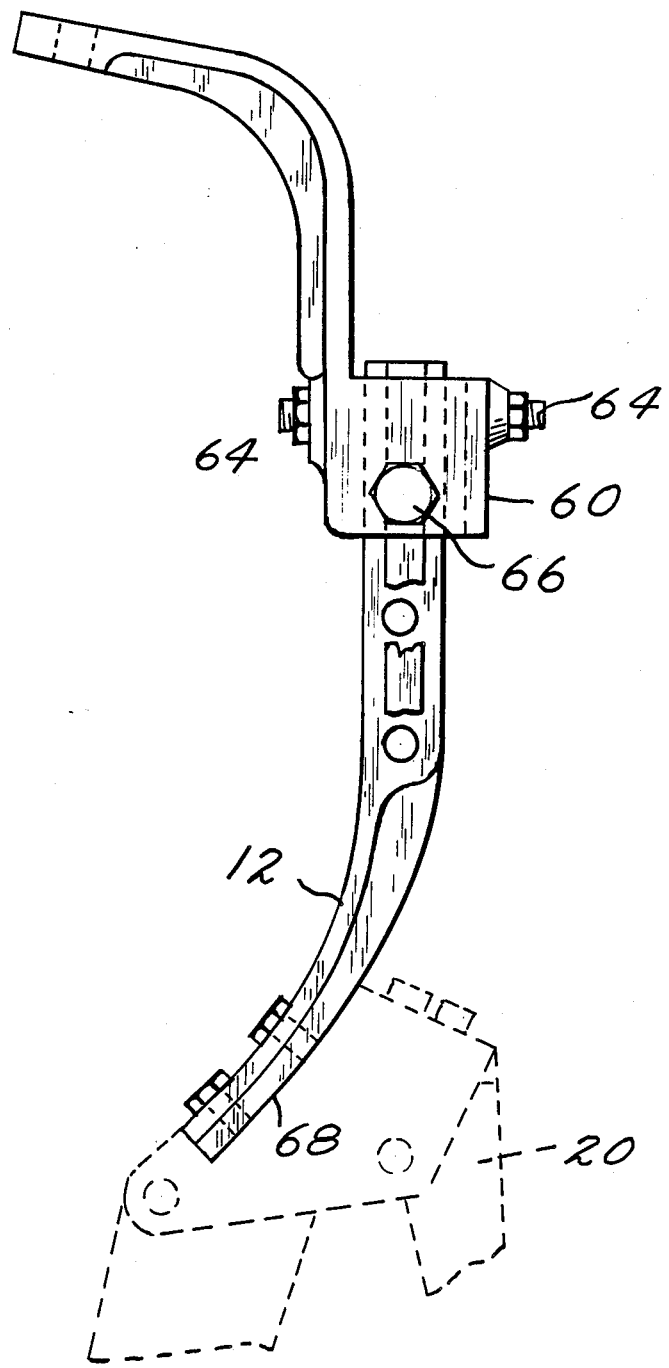

In another embodiment, as shown in FIG. 7, the shank 12 to which the apparatus 20, for example, is attached is vertically adjustable relative to the shank support bracket 60. Thus, an operator will be able to adjust the position of the shank and, hence, the above-described apparatus relative to the soil by simply loosening set screws 64 in bracket 60 and moving the shank 12 relative to the bracket 60. A bolt 66 may also be employed. The shank 12 at its lower end includes a pad 68 on which is mounted the apparatus 20. With this arrangement, a user may compensate for the load imposed on the implements as well as any tripping mechanisms normally employed with such implements.

What is claimed is:

1. An apparatus for simultaneously fertilizing and seeding and adapted to connect to a cultivator shank, said apparatus comprising:
    an adapter member fixedly securable to said shank and including a pair of conduits for individually conveying fertilizer and seed respectively;
    means for pivotally mounting a fertilizer blade to said adapter and including means limiting pivoting motion of the fertilizer blade in a backward direction to the working position and having a fertilizer conveying channel communicating with one of said conduits at said normal operating position and extending to a distal end of said fertilizer blade; and
    means pivotally mounting a double seeder blade to said adapter and including means limiting pivoting motion of said double seeder blade in a backward direction to the working position and a seed conveying channel communicating with the other of said conduits at said normal operating position and extending to a distal end of said double seeder blade; and
    said apparatus being mounted adjacent one end of shank means, said shank means being means having releasable shank positioning means carried by a bracket so that, in use, said shank means is vertically movable to a selected position relative to said bracket means.

2. The apparatus of claim 1 wherein said releasable shown positioning means includes means for releasably locking said shank means in a selected position on said bracket means.

* * * * *